US012720325B2

(12) United States Patent
Rathore et al.

(10) Patent No.: US 12,720,325 B2
(45) Date of Patent: Aug. 25, 2026

(54) METHOD OF MONITORING TELECOMMUNICATION NETWORK AND SYSTEM FOR IMPLEMENTING THE SAME

(71) Applicant: Rakuten Mobile, Inc., Tokyo (JP)

(72) Inventors: Shubham Rathore, Indore (IN); Jeetesh Acharya, Indore (IN); Rajeshwar Tomar, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 512 days.

(21) Appl. No.: 18/248,053

(22) PCT Filed: Oct. 21, 2022

(86) PCT No.: PCT/US2022/047344
§ 371 (c)(1),
(2) Date: Apr. 6, 2023

(87) PCT Pub. No.: WO2024/085879
PCT Pub. Date: Apr. 25, 2024

(65) Prior Publication Data
US 2024/0373246 A1 Nov. 7, 2024

(51) Int. Cl.
*H04W 16/18* (2009.01)
*H04W 24/04* (2009.01)

(52) U.S. Cl.
CPC ........... *H04W 16/18* (2013.01); *H04W 24/04* (2013.01)

(58) Field of Classification Search
CPC ..... H04W 16/18; H04W 24/04; H04W 24/02; H04W 24/08; H04L 43/065; H04L 43/08
See application file for complete search history.

(56) References Cited

U.S. PATENT DOCUMENTS 6,952,181 B2 * 10/2005 Karr ........................ G01S 5/021 342/453
2006/0294260 A1 * 12/2006 Young ..................... H04L 67/75 709/200

(Continued)

FOREIGN PATENT DOCUMENTS

EP 3349500 A1 * 7/2018 ............ H04W 24/02

*Primary Examiner* — Yuwen Pan
*Assistant Examiner* — Swati Jain
(74) *Attorney, Agent, or Firm* — HAUPTMAN HAM, LLP

(57) ABSTRACT

A method of monitoring a telecommunication network includes determining whether a coverage boundary for a new site overlaps with a coverage area for a first existing site. The method further includes determining a minimum distance between existing sites of a plurality of existing sites, in response to determining that the coverage boundary overlaps with the coverage area for the first existing site. The method further includes determining a final distance based on the minimum distance. The method further includes setting a coverage area for the new site based on the final distance. The method further includes generating a user interface (UI) based on network performance values in the coverage area for the new site and the coverage area of the first existing site, wherein generating the UI comprises excluding network performance values associated with the first existing site from locations within the coverage area of the new site.

20 Claims, 5 Drawing Sheets

(56) References Cited

U.S. PATENT DOCUMENTS

| | | | | |
|---|---|---|---|---|
| 2009/0143018 | A1* | 6/2009 | Anderson | G01S 5/021<br>455/67.11 |
| 2017/0318555 | A1* | 11/2017 | Libschitz | H04W 24/10 |
| 2018/0352309 | A1* | 12/2018 | Hopcraft | H04L 41/145 |
| 2019/0087840 | A1* | 3/2019 | Zachariah | G06Q 30/0205 |
| 2020/0229206 | A1* | 7/2020 | Badic | G05D 1/6445 |
| 2024/0121743 | A1* | 4/2024 | Mansour | H04W 60/04 |
| 2024/0132088 | A1* | 4/2024 | Koeberle | G05B 17/02 |

* cited by examiner

METHOD OF MONITORING TELECOMMUNICATION NETWORK AND SYSTEM FOR IMPLEMENTING THE SAME

RELATED APPLICATIONS

The present application is the National Phase of International Application No. PCT/US2022/047344, filed Oct. 21, 2022.

TECHNICAL FIELD

This description relates to a method of monitoring a telecommunication network and a system for implementing the same.

BACKGROUND

Monitoring a telecommunication network includes using user interfaces (UIs) to determine network performance in different locations. The UIs used data captured from base stations within the telecommunication network. In some instances, base stations within the network have overlapping coverage areas. The base stations collect key performance indicator (KPI) data and provide that data to a server accessible by a network monitor to generation of the UIs. In some instances, the KPI data is based on a moving average, e.g., 7 day moving average, to help determine a consistent level of performance of the network without putting disproportionate weight on short term outages within the network.

SUMMARY

An aspect of this description relates to a method of monitoring a telecommunication network. The method includes determining whether a coverage boundary for a new site overlaps with a coverage area for a first existing site. The method further includes determining a minimum distance between existing sites of a plurality of existing sites, in response to determining that the coverage boundary for the new site overlaps with the coverage area for the first existing site, wherein the first existing site is one of the plurality of existing sites. The method further includes determining a final distance based on the minimum distance. The method further includes setting a coverage area for the new site based on the final distance. The method further includes generating a user interface (UI) based on network performance values in the coverage area for the new site and the coverage area of the first existing site, wherein generating the UI comprises excluding network performance values associated with the first existing site from locations within the coverage area of the new site.

An aspect of this description relates to a system for monitoring a telecommunication network. The system includes a non-transitory computer readable medium, wherein the non-transitory computer readable medium is configured to store instructions thereon. The system further includes a processor connected to the non-transitory computer readable medium. The processor is configured to execute the instructions for determining whether a coverage boundary for a new site overlaps with a coverage area for a first existing site. The processor is further configured to execute the instructions for determining a minimum distance between existing sites of a plurality of existing sites, in response to determining that the coverage boundary for the new site overlaps with the coverage area for the first existing site, wherein the first existing site is one of the plurality of existing sites. The processor is further configured to execute the instructions for determining a final distance based on the minimum distance. The processor is further configured to execute the instructions for setting a coverage area for the new site based on the final distance. The processor is further configured to execute the instructions for generating a user interface (UI) based on network performance values in the coverage area for the new site and the coverage area of the first existing site, wherein generating the UI comprises excluding network performance values associated with the first existing site from locations within the coverage area of the new site.

An aspect of this description relates to a non-transitory computer readable medium configured to store instructions thereon. The instructions are configured to cause a processor to determine whether a coverage boundary for a new site overlaps with a coverage area for a first existing site. The instructions are further configured to cause a processor to determine a minimum distance between existing sites of a plurality of existing sites, in response to determining that the coverage boundary for the new site overlaps with the coverage area for the first existing site, wherein the first existing site is one of the plurality of existing sites. The instructions are further configured to cause a processor to determine a final distance based on the minimum distance. The instructions are further configured to cause a processor to set a coverage area for the new site based on the final distance. The instructions are further configured to cause a processor to generate a user interface (UI) based on network performance values in the coverage area for the new site and the coverage area of the first existing site, wherein generating the UI comprises excluding network performance values associated with the first existing site from locations within the coverage area of the new site.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
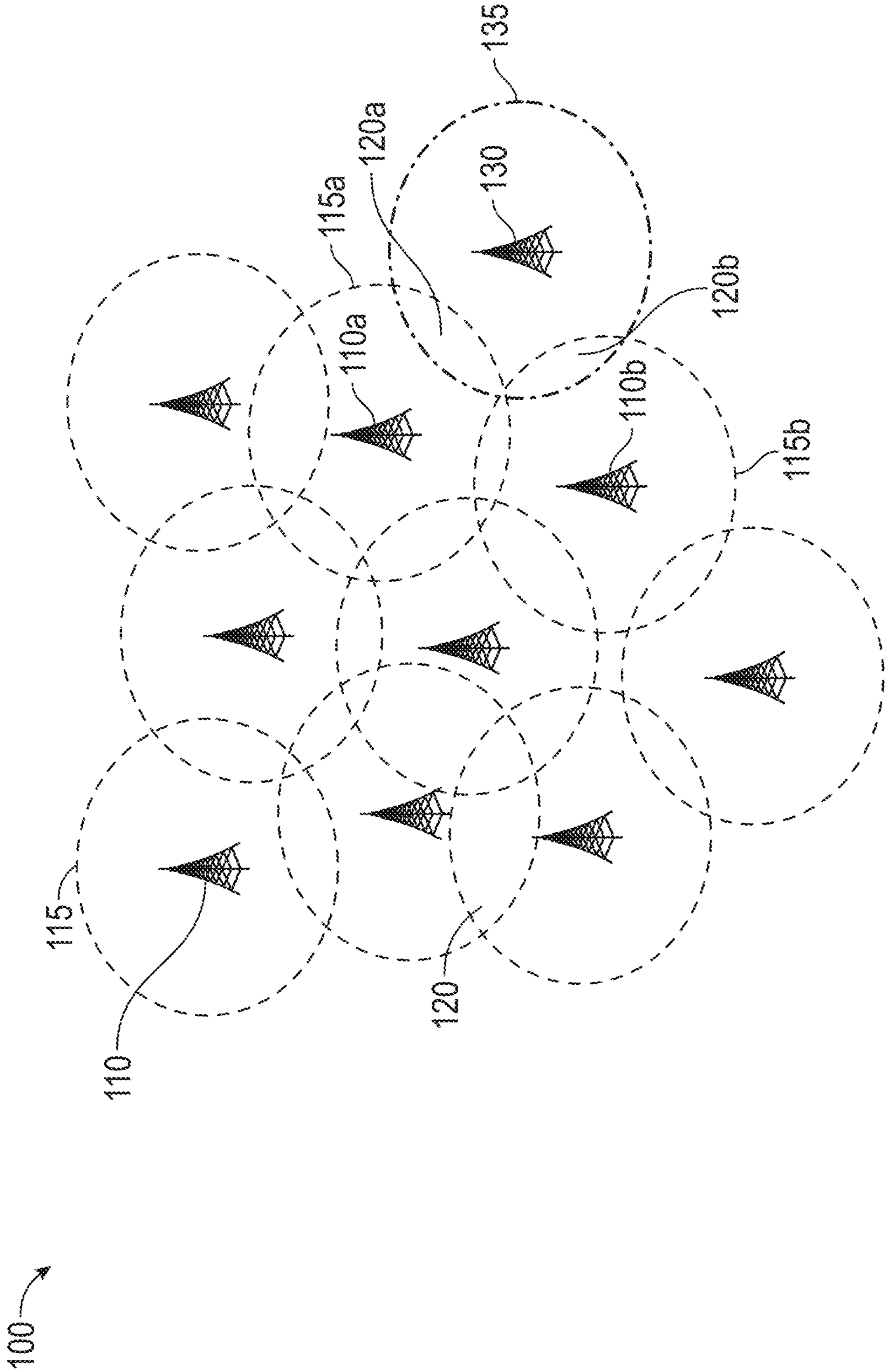
FIG. 1 is a schematic diagram of a telecommunication network in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A network monitor tracks performance of a telecommunication network, also called a network, using various tools. In some instances, the network monitor looks at current performance key performance indicators (KPIs), such as reference signal receive power (RSRP), signal to interference/noise ratio (SINR), latency, jitter, packet loss, etc. The current performance information provides the network monitor with information for how the network is currently performing, e.g., the current health of the network. However, in some instances, the network monitor uses a rolling average of KPI data to access the performance, e.g., health, of the network over time. The use of the rolling average KPI data to assess the network performance is valuable to reduce the risk of overreaction to temporary interruptions or outages within the network when evaluating the overall performance of the network.

Further, as networks expand more sites, also called base stations, are added to the network. These sites expand the coverage of the network based on a coverage area of the equipment at the site. In some instances, the coverage area of new site overlaps with a coverage area of one or more previously existing sites. Once the new site becomes active, performance in the overlapping coverage areas of sites means that the performance within those overlapping coverage area is significantly changed. For example, one of ordinary skill in the art would expect an outer periphery of a coverage area for a previously existing site to have weaker performance in comparison with a location closer to a center of the coverage area of the site. As a result, when the new site is activated and the coverage area of the new site overlaps with the outer periphery of the previously existing site, one of ordinary skill in the art would expect that the performance of the network at that overlapping coverage area will be noticeably improved in comparison with a time period prior to activation of the new site.

In order to help network monitors to precisely determine the overall performance of the network using the rolling average KPI data, this description includes a method and a system for correcting the data in overlapping coverage areas for newly activated sites. This correction helps the network monitor to more precisely determine the performance of the network once the new site is activated. The ability to determine the performance of the network more precisely with the newly activated site helps to reduce the risk of sending maintenance/repair crews to sites that impact the overlapping coverage area. Additionally, the network monitor does not expend time and money attempting to diagnose a problem with sites that impact the overlapping coverage area based on outdated KPI data.

In some instances, the method and system exclude data prior to the activation of the new site from the rolling average data for the overlapping coverage area from the information viewed by the network monitor. For example, in a situation where a new site is activated and the new site has a coverage area that overlaps with a pre-existing coverage area in five map grids for the network, the method and system will exclude KPI data from the rolling average KPI data for those five map grids if the KPI data was collected prior to the activation of the new site. A map grid is a geographic area usable to help network monitors determine to correlate network performance with specific locations covered by the network. By excluding KPI data that was collected prior to the activation of the new site, the rolling average KPI data viewed by the network monitor is more reflective of the actual performance of the network because poor performance at the periphery of the pre-existing coverage area is not skewing the rolling average KPI data based on an outdated network configuration. The more precise and accurate the rolling average KPI data relied upon by the network monitors helps to invest maintenance/repair and expansion resources for the network more efficiently in order to more effectively maintain or enhance customer satisfaction for users of the network.

FIG. 1 is a schematic diagram of a telecommunication network 100 in accordance with some embodiments. The telecommunication network 100 includes a plurality of base stations 110 and each base station 110 has a corresponding coverage area 115. In some instances, cover areas 115 for neighboring base stations 110 overlap one another to define an overlapping coverage area 120. In some instances, a gap 125 exists between coverage areas 115 of neighboring base stations 110. A mobile device within the telecommunication network 100 is able to connect to one or more base station 110 when the mobile device is within the coverage area 115 corresponding to the base station 110.

A new base station 130 is a newly activated base station within the telecommunication network 100. The new base station 130 has a coverage area 135. The coverage area 135 overlaps with the coverage area **115*a* for the base station 110*a* to define overlapping coverage area 120*a*. The coverage area 135 also overlaps with the coverage area 115*b* for base station 110*b* to define overlapping coverage area 120*b*. Once the new base station 130 is activated, KPI data for overlapping coverage area 120*a* and overlapping coverage area 120*b* will change significantly from the KPI data prior to the activation of the new base station 130. Continuing to rely on rolling average data that includes KPI data prior to the activation of the new base station 130 will decrease the accuracy and precision of the performance of the telecommunication network 100 at the locations within the overlapping coverage area 120*a* and the overlapping coverage area 120*b***.

Figure 2:
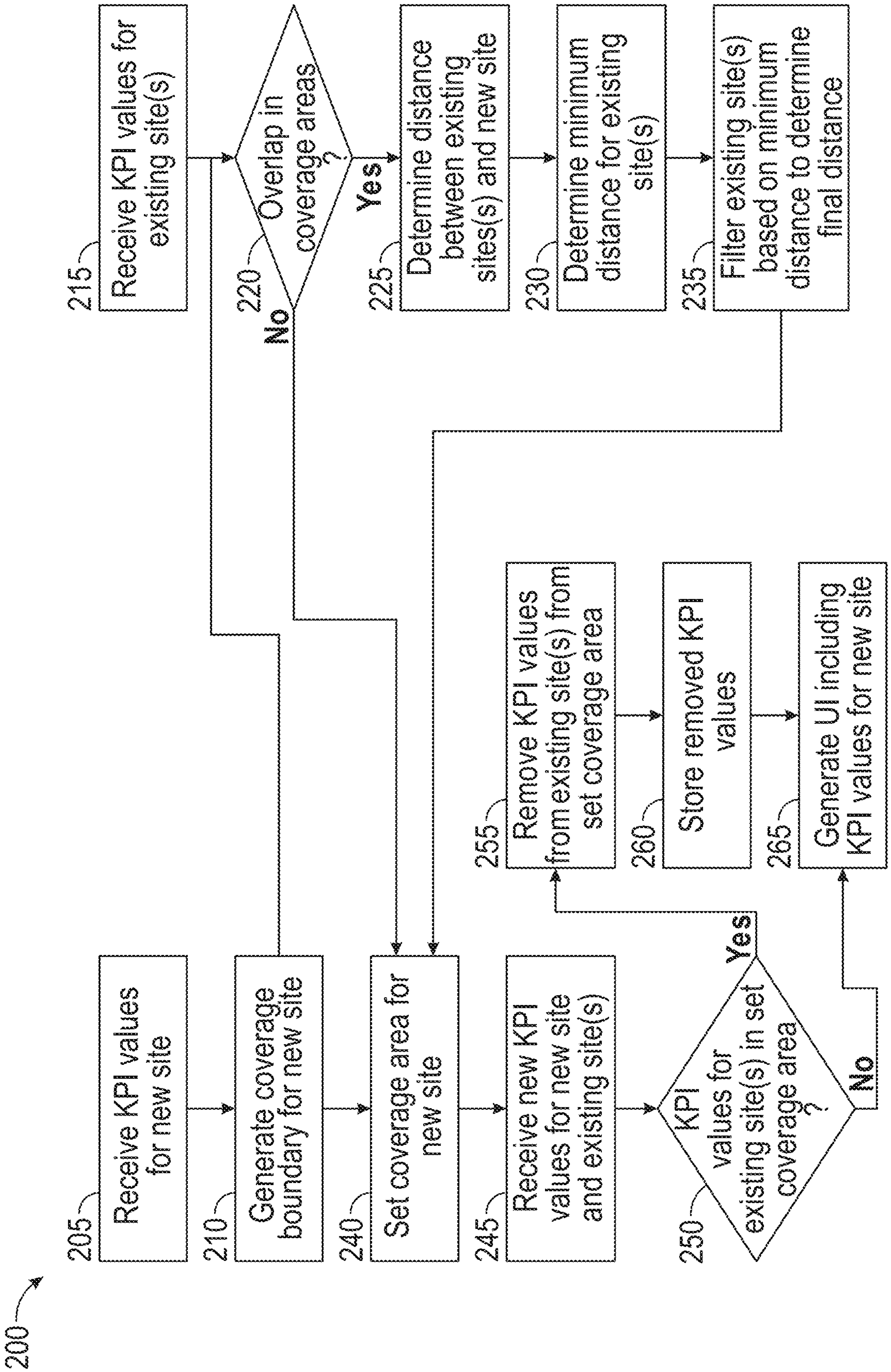
FIG. 2 is a flowchart of a method of generating a user interface (UI) in accordance with some embodiments.

FIG. 2 is a flowchart of a method 200 of generating a user interface (UI) in accordance with some embodiments. The method 200 is usable to generate the UI for display to a network monitor in order to facilitate assessment of network performance in a situation where a new site, i.e., base station, becomes activate within the network. The method 200 describes criteria for excluding data from coverage areas for pre-existing sites to overlap with the coverage area of the newly activated site. As a result, the method 200 is able to produce a more precise and accurate UI representation of the performance of the network following the activation of the new site in comparison with other approaches. The ability to more precisely and accurately determine the performance of the network helps to improve efficiency in network maintenance and more effective planning for expansion of the network. The increase in network maintenance efficiency results from avoiding directing repair/maintenance crews to locations where poor network performance is seen in the UI based on outdated or inaccurate data. The improvement in effective planning for expansion of the network results from the ability to assess the current total coverage area and performance of all sites in the network include the most recently activated sites. This allows network providers the ability to determine where additional equipment is able to be most effectively deployed to improve customer satisfaction.

In the operation 205, KPI values are received for a new site. The KPI values indicate a performance of the network within the coverage area of the new site. In this description, a site station is a site that is activated within a duration of a rolling average of KPI values used to generate a UI for displaying network performance to a network monitor. For example, in some instances, the rolling average is seven days of KPI data. In such a situation any site that is activated less than seven days from a time in which the method 200 is implemented would be considered a new site. One of ordinary skill in the art would understand that a rolling average of seven days is merely exemplary and that other values for the rolling average are within the skill of one of ordinary skill in the art, e.g., ten days, thirty days, two weeks, etc.

In some embodiments, the KPI values include at least one of RSRP, SINR, latency, jitter, packet loss, dropped calls, or other suitable KPI values. In some embodiments, the KPI values are received from mobile device within the coverage area of the new site. In some embodiments, the KPI values are received from the equipment of the new site. In some embodiments, the KPI values are received wirelessly. In some embodiments, the KPI values are received via a wired connection.

In operation 210, a coverage boundary is generated for the new site. In some embodiments, the coverage boundary is determined based on the KPI values received in operation 205. In some embodiments, the coverage boundary is set by measuring KPI values at various locations surrounding the new site to determine the farthest locations from the new site that provide acceptable network performance. Based on the received KPI values at various locations surrounding the site, a determination is made regarding how far from the site the KPI values indicate acceptable performance of the network. In some embodiments, the coverage boundary is set based on a designed performance of the new site. In some instances, the coverage boundary overlaps with a coverage area of a pre-existing site. In some embodiments, the coverage boundary overlaps coverage areas of multiple pre-existing sites. In some embodiments, the coverage boundary does not overlap any coverage area of pre-existing sites.

In operation 215, KPI values are received for existing sites within the network. Similar to operation 205, the KPI values indicate a performance of the network within the coverage area of each of the corresponding sites within the network. In some embodiments, the coverage areas of the existing sites overlap. In some instances, the existing sites are called pre-existing sites with respect to the new site.

In some embodiments, the KPI values include at least one of RSRP, SINR, latency, jitter, packet loss, dropped calls, or other suitable KPI values. In some embodiments, the KPI values are received from mobile device within the coverage area of the new site. In some embodiments, the KPI values are received from the equipment of the new site. In some embodiments, the KPI values are received wirelessly. In some embodiments, the KPI values are received via a wired connection.

In operation 220, a determination is made regarding whether the coverage boundary for the new site overlaps with the coverage area for any of the existing sites. The determination of whether coverage areas overlap is made based on a location of the existing sites, the location of the new site, and a size and a shape of the coverage area for each of the existing sites and the new site. While the shape of the coverage area is drawn as a circle, for example, in FIG. 1, one of ordinary skill in the art would recognize that in practice a shape of the coverage area for a site is based on an orientation of antenna within the site as well as geographic features near the site. Geographic features include terrain, such as hills; buildings; or other natural or man-made structures that block or interfere with radio signals.

In response to a determination that the coverage boundary for the new site overlaps a coverage area for at least one existing site, the method 200 proceeds to operation 220. In response to a determination that the coverage boundary for the new site does not overlap a coverage area for any existing site, the method 200 proceeds to operation 240.

In operation 225, a distance between at least one existing site and the new site is determined. The distance between an existing site and a new site is determined for each existing site that has an overlapping coverage area with the coverage boundary for the new site. For the sake of simplicity, most of the description below will focus on a single existing site. However, one of ordinary skill in the art would understand that the description is applicable to each of the existing sites with an overlapping coverage area. The distance between the existing site and the new site is determined based on longitude and latitude locations of each of the existing site and the new site. A radius of the Earth is also factored into the distance between the existing site and the new site.

In operation 230, a minimum distance between existing sites is determined. The minimum distance between existing sites is determined based on longitude and latitude locations of existing sites and neighboring existing sites. A radius of the Earth is also factored into the distance between existing sites. Once the distance between each existing site and neighboring existing sites within the network are determined, a standard deviation of the distances is used to determine the minimum distance between existing sites.

In operation 235, the existing sites are filtered based on the determined minimum distance to determine a final distance. Filtering the existing sites includes excluding sites that are a predetermined distance away from the new site for later determination of a coverage area of the new site. The final distance is subsequently used to determine a coverage area for the new site. In some embodiments, the from the new site to existing sites is set to existing sites within two standard deviations from the new site. In some instances, due to terrain or population density, one or more existing sites are a long distance from any neighboring existing sites. In order to reduce the impact of these sites in the determination of the coverage area of the new site, these sites are also excluded in some embodiments. Further, in some embodiments, a proximity of existing sites depends on population density. In some embodiments, the predetermined distance is set based on a population density near the new site. In some embodiments, the predetermined distance is 50 kilometers (km) or less for a suburban or rural area. In some embodiments, the predetermined distance is 10 km or less for an urban area. In some embodiments, instead of a set magnitude, such as 50 km or 10 km, the predetermined distance is set as a multiplying factor of the standard deviation determined in operation 230. As a population density increases, the multiplying factor increases in order to help establish a precise and accurate determination of network performance.

In operation 240, the coverage area for the new site is set. The coverage area is determined based on the final distance determined in operation 235, as well as a location of the new site. The location of the new site is determined based on longitude and latitude of the site as a center point of the coverage area. A size of the coverage around surrounding the location of the new site is determined based on the final distance. In some embodiments, a multiplying factor is associated with the final distance to determine the size of the coverage area for the new site. The multiplying factor is less than 1. Using a multiplying factor of less than 1 helps to reduce the risk of excluding data that is very close to existing sites that neighbor the new site. KPI values that are located close to the neighboring existing sites are not likely to be significantly impacted by the activation of the new site. Therefore, excluding the KPI values located close to the neighboring existing sites is unnecessary and could reduce precision and accurate of the measurement of network performance. In some embodiments, the multiplying factor ranges from about 0.5 to about 0.8. In some embodiments, the multiplying factor is about 0.7. In some embodiments, the multiplying factor is determined based on a magnitude of the final distance. For example, in some embodiments, as the final distance increases, the multiplying factor also increases. The final distance is determined based on geographic separation between sites. Therefore, as the distance between sites increases the impact of the activation of the new site will increase for a larger portion of the coverage area of the neighboring existing sites. In order to improve precision and accuracy of the KPI values used to determine network performance following activation of the new site, the network monitor is able to select an appropriate multiplying factor. In some embodiments, a system executing the method 200 is able to recommend a multiplying factor based on the final distance and/or other criteria.

In operation 245, KPI values are received for the new site and existing sites within the network. In some embodiments, the operation 245 is performed in a similar manner as operation 205 and operation 215. In some embodiments, the operation 245 is performed is a regular predetermined cycle following operation 205 and/or operation 215. In some embodiments, a duration of the predetermined cycle ranges from about 30 seconds(s) to about 5 minutes (min). As the duration increases, accuracy and performance of the network performance are reduced in some instances. As the duration decreases, a processing load on a system implementing the method 200 increases in some instances.

In operation 250, a determination is made regarding whether any of the received KPI values from operation 245 are within the coverage area for the new site set in operation 240. The location of the KPI values is determined based on a longitude and latitude of a location of the KPI values. The coverage area of the new site is the coverage area determined in operation 240. In response to a determination that at least one KPI value for an existing site is within the coverage area of the new site, the method 200 proceeds to operation 255. In response to a determination that none of the KPI values for existing sites are within the coverage area of the new site, the method 200 proceeds to operation 265.

In operation 255, KPI values associated with the existing sites that are within the coverage area of the new site are removed. As a result, the only KPI data utilized in determination of rolling averages within the coverage area of the new site is the KPI data associated with the new site. As noted above, exclusion of the KPI values associated with the existing sites that are within the coverage area of the new site helps to improve precision and accuracy of determining network performance. The increase in precision and accuracy in determination of network performance helps to improve efficiency in network maintenance as well as plans for network expansion.

In operation 260, the removed KPI values are stored. The removed KPI values are stored in order to allow analysis of the existing sites on an individual basis in order to determine whether an individual site is performing in a satisfactory manner. In some embodiments, the removed KPI values are stored until a duration of the rolling average is completed. For example, in some embodiments where the rolling average has a duration of seven days, the removed KPI values are stored for seven days from the activation of the new site. At the end of the storing duration, the overwriting of the removed KPI values is permitted. Ensuring that the KPI values are stored for the duration of the rolling average following activation of the new site helps to provide reliable evaluation of the existing sites. Permitting overwriting of the KPI values following the duration of the rolling average after activation of the new site helps to reduce an amount of storage utilized by a system implementing the method 200.

In operation 265, a UI is generated including the KPI values for the new site and excluding the KPI values removed in operation 255. The UI is viewable by the network monitor in order to evaluate network performance at various locations covered by the network. The UI generated using the method 200 is improved in comparison with a UI generated using other approaches because the precision and accuracy of the UI is enhanced by excluding KPI data associated with existing sites within a coverage area of the newly activated site. This helps to prevent outdated data from significantly impacting the network performance viewed by the network monitor. As a result, efficiency and effectiveness of network maintenance and expansion are improved in comparison with other approaches.

In some embodiments, the method 200 includes additional operations. For example, in some embodiments, the method 200 includes an automatic recommendation for maintenance/repair of a site based on the network performance indicated by the UI. In some embodiments, at least one operation of the method 200 is omitted. For example, in some embodiments, the operation 235 is omitted in a situation where a number of existing sites is small. In some embodiments, an order of operations of the method 200 is adjusted. For example, in some embodiments, the operation 240 occurs after the operation 245.

Figure 3:
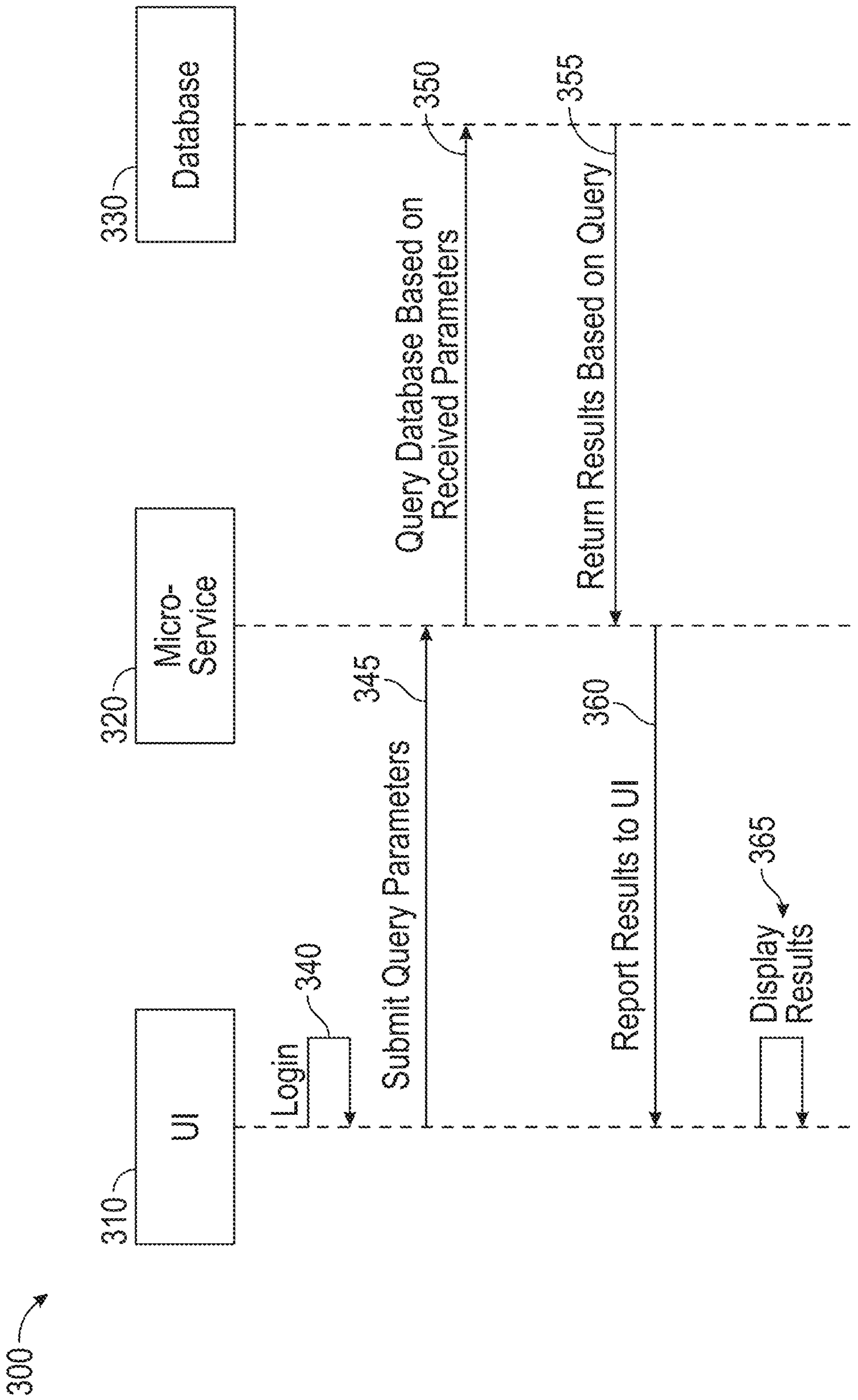
FIG. 3 is a sequence flow diagram for retrieving data to generate a UI in accordance with some embodiments.

FIG. 3 is a sequence flow diagram 300 for retrieving data to generate a UI in accordance with some embodiments. In some embodiments, the sequence flow diagram 300 is usable to access removed KPI data, such as that stored in operation 260 of method 200 (FIG. 2). In some embodiments, the sequence flow diagram 300 is usable separate from the method 200 (FIG. 2). The sequence flow diagram 300 includes operations implemented using a UI 310, a micro-service 320, and a database 330. In some embodiments, the UI 310 corresponds to a UI generated in operation 265 of the method 200 (FIG. 2). In some embodiments, the UI 310 is separate from the UI generated in the method 200 (FIG. 2). The micro-service 320 is usable to implement the functionality of retrieving KPI data from the database 330. In some embodiments, the micro-service 320 communicates with the UI 310 using an application programming interface (API). The database 330 is usable to store KPI data. In some embodiments, the database 330 is usable to implement operation 260 in the method 200 (FIG. 2). In some embodiments, the database 330 is stores data other than data from the method 200 (FIG. 2). In some embodiments, the database 330 includes a single non-transitory data storage, such as a non-volatile memory. In some embodiments, the database 330 includes multiple non-transitory data storages.

In operation 340, a user, such as a network monitor, logs into the UI 310. The user logs into the UI 310 using credentials. In some embodiments, the credentials include a username and password; facial recognition, biometric data, or other suitable credentials.

In operation 345, the user submits a query for parameter data. In some embodiments, the query is submitted using an API to communicate between the UI 310 and the micro-service 320. In some embodiments, the user enters the query into the UI 310 using an input/output (I/O) device. In some embodiments, the I/O device includes one or more of a keyboard, a mouse, a touch screen, voice detection, or other suitable I/O devices. In some embodiments, the query is transmitted from the UI 310 to the micro-service 320 wirelessly. In some embodiments, the query is transmitted from the UI 310 to the micro-service 320 via a wired connection.

In operation 350, the micro-service 320 queries the database 330 to receive the requested parameters from the user. In some embodiments, the query is transmitted from the micro-service 320 to the database 330 wirelessly. In some embodiments, the query is transmitted from the micro-service 320 to the database 330 via a wired connection.

In operation 355, the database 330 provides the result of the query to the micro-service 320. In some embodiments, the results are transmitted to the micro-service 320 from the database 330 wirelessly. In some embodiments, the results are transmitted to the micro-service 320 from the database 330 via a wired connection.

In operation 360, the micro-service 320 reports the results to the UI 310. In some embodiments, the results are reported using an API to communicate between the UI 310 and the micro-service 320. In some embodiments, the results are reported to the UI 310 from the micro-service 320 wirelessly. In some embodiments, the results are reported to the UI 310 from the micro-service 320 via a wired connection.

In operation 365, the UI 310 displays the results. In some embodiments, the results are displayed as a table. In some embodiments, the results are displayed graphically. In some embodiments, a manner of displaying the results is determined based on a user input detected by the UI 310.

Utilizing the sequence flow diagram 300, a user is able to retrieve data not currently visible in the UI 310 to assess performance of one or more sites within the network. This helps to improve efficiency in network maintenance. The ability to display the retrieved data on the UI 310 also helps to enhance the versatility of the UI 310.

In some embodiments, the sequence flow diagram 300 includes additional operations. For example, in some embodiments, the sequence flow diagram 300 includes an automatic recommendation for maintenance/repair of a site based on the network retrieved data. In some embodiments, at least one operation of the sequence flow diagram 300 is omitted. For example, in some embodiments, the operation 340 is omitted in a situation where the user is already logged onto the UI 310. In some embodiments, an order of operations of the sequence flow diagram 300 is adjusted. For example, in some embodiments, data is displayed on the UI 310 prior to submission of queries to the micro-services 320 and the data is then updated in operation 365.

Figure 4:
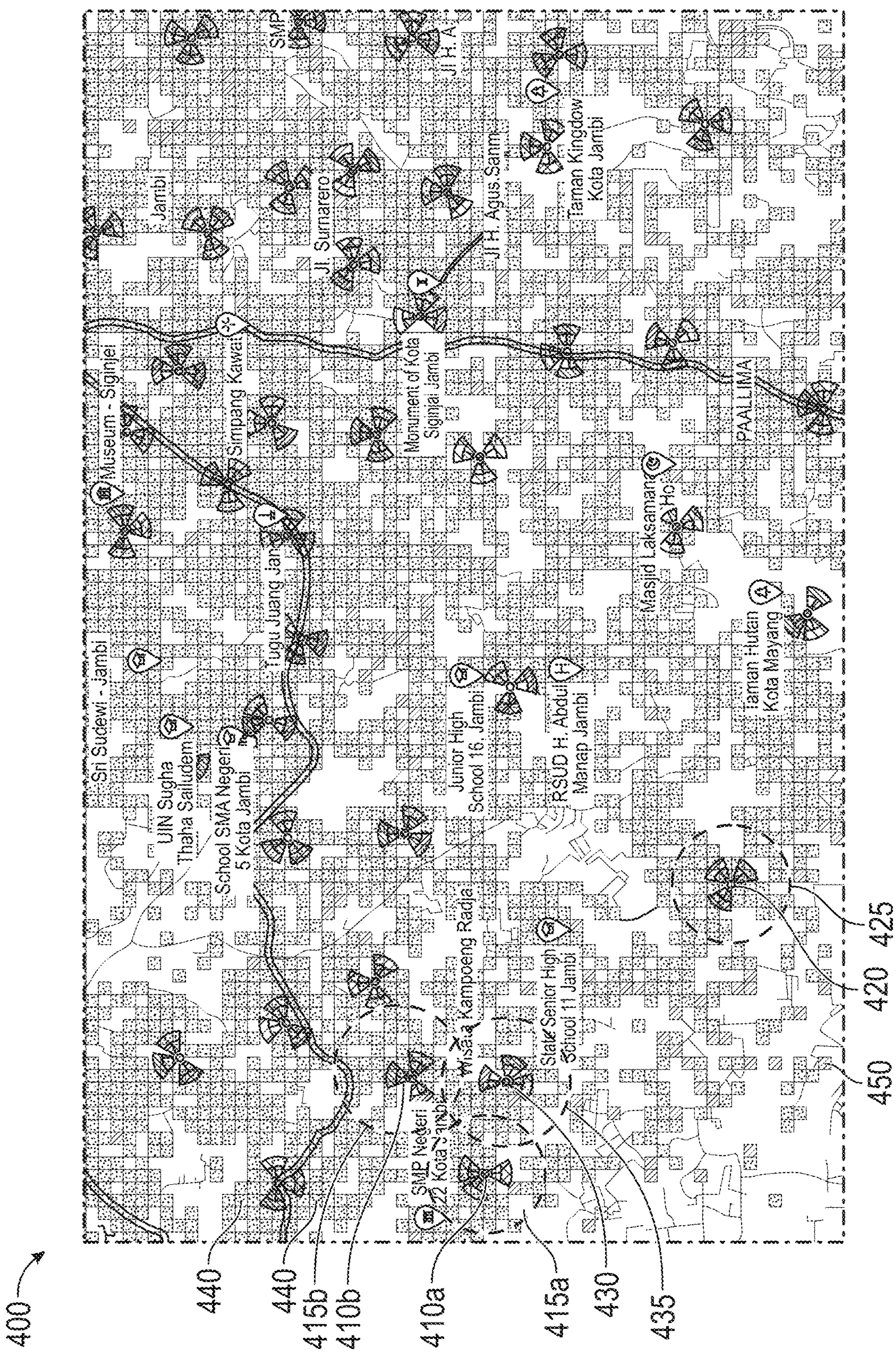
FIG. 4 is a diagram of a UI in accordance with some embodiments.

FIG. 4 is a diagram of a UI 400 in accordance with some embodiments. In some embodiments, the UI 400 is generated using operation 265 of the method 200 (FIG. 2). In some embodiments, the UI 400 is generated using an operation other than that in the method 200 (FIG. 2). In some embodiments, the UI 400 corresponds to the UI 310 (FIG. 2). In some embodiments, the UI 400 is different from UI 310 (FIG. 3). The UI 400 is usable to display network performance data as well as site locations. The UI 400 includes a display of coverage areas for several sites. In some embodiments, the coverage areas are not displayed on the UI 400 for simplicity and ease of understanding the network performance data.

The UI 400 includes a first existing site 410*a* having a coverage area 415*a*. The UI 400 further includes a second existing site 410*b* having a coverage area 415*b*. The first existing site 410*a* is near the second existing site 410*b*. The UI 400 further includes a third existing site 420 having a coverage area 425. The third existing site 420 is a long distance from each of the first existing site 410*a* and the second existing site 410*b*. The UI 400 further includes a new site 430 having a coverage area 435. The coverage area 435 overlaps the coverage area 410*a* as well as the coverage area 410*b*.

The UI 400 further includes map grid locations 440 and 450. Each of the map grid locations 440 and 450 indicates a performance of the network at a location of the map grid. In the UI 400, each of the map grids has a square shape. One of ordinary skill in the art would understand that a square shape is merely exemplary and that this application is no limited to only square shaped map grids, such as triangular, rectangular, octagonal, hexagonal, or any other suitable shape.

A satisfactory network performance is indicated by map grid 440. An unsatisfactory network performance is indicated by map grid 450. A color of the map grid 440 is different from a color of the map grid 450 to indicate different network performance levels. One of ordinary skill in the art would understand that color difference to determine differences in network performance is merely exemplary and that other visual differences are within the scope of this application, such as hashing, icons, or other suitable visual indicators. In some embodiments, the network performance is determined based on a rolling average of KPI values captured at the various map grid locations 440 and 450.

The following description relates the UI 400 to operations of the method 200 (FIG. 2), for the sake of simplicity and clarity. One of ordinary skill in the art would understand that the UI 400 is not limited to use with the method 200 (FIG. 2). The coverage area 435 of the new site overlaps with the coverage areas 415*a* and 415*b* of the first and second existing sites 410*a* and 410*b*, respectively, e.g., as in operation 220 (FIG. 2). Upon activation of the new site 430, KPI values from the first and second existing sites 410*a* and 410*b* within these overlapping coverage areas will skew the perceived network performance to be similar to the perceived network performance prior to activation of the new site 430. This type of skewing would result in imprecise and inaccurate assessments of the actual performance of the network following activation of the new site 430. Excluding the consideration of the KPI values within these overlapping coverage areas, e.g., as in operation 255 (FIG. 2), would improve the precision and accuracy of the assessment of the network performance. As a result, a network monitor reviewing the UI 400, e.g., as generated in operation 265 (FIG. 2), would be able to make better determinations regarding network maintenance and expansion.

In some embodiments, a system used to generate UI 400 is also able to generate recommendations for maintenance to sites within the network based on map grid location 440 and 450 data. For example, in some embodiments, in response to detecting a cluster of unsatisfactory network performance map grids 450 within a coverage area of a site, the system is able to generate an alert to the network monitor regarding potential network maintenance. In some embodiments, the alert includes an audio or visual alert. In some embodiments, the alert is transmitted to a device accessible by the network monitor. In some embodiments, the alert includes recommended repairs to address the network performance issue. In some embodiments, the network monitor is able to use the UI 400 to transmit repair/maintenance instructions to a maintenance crew based on the alert. In some embodiments, the network monitor is able to remotely access the site to attempt to resolve the network performance issue. In some embodiments, the alert includes a link to allow the network monitor to access the site where the network performance problem was identified.

Figure 5:
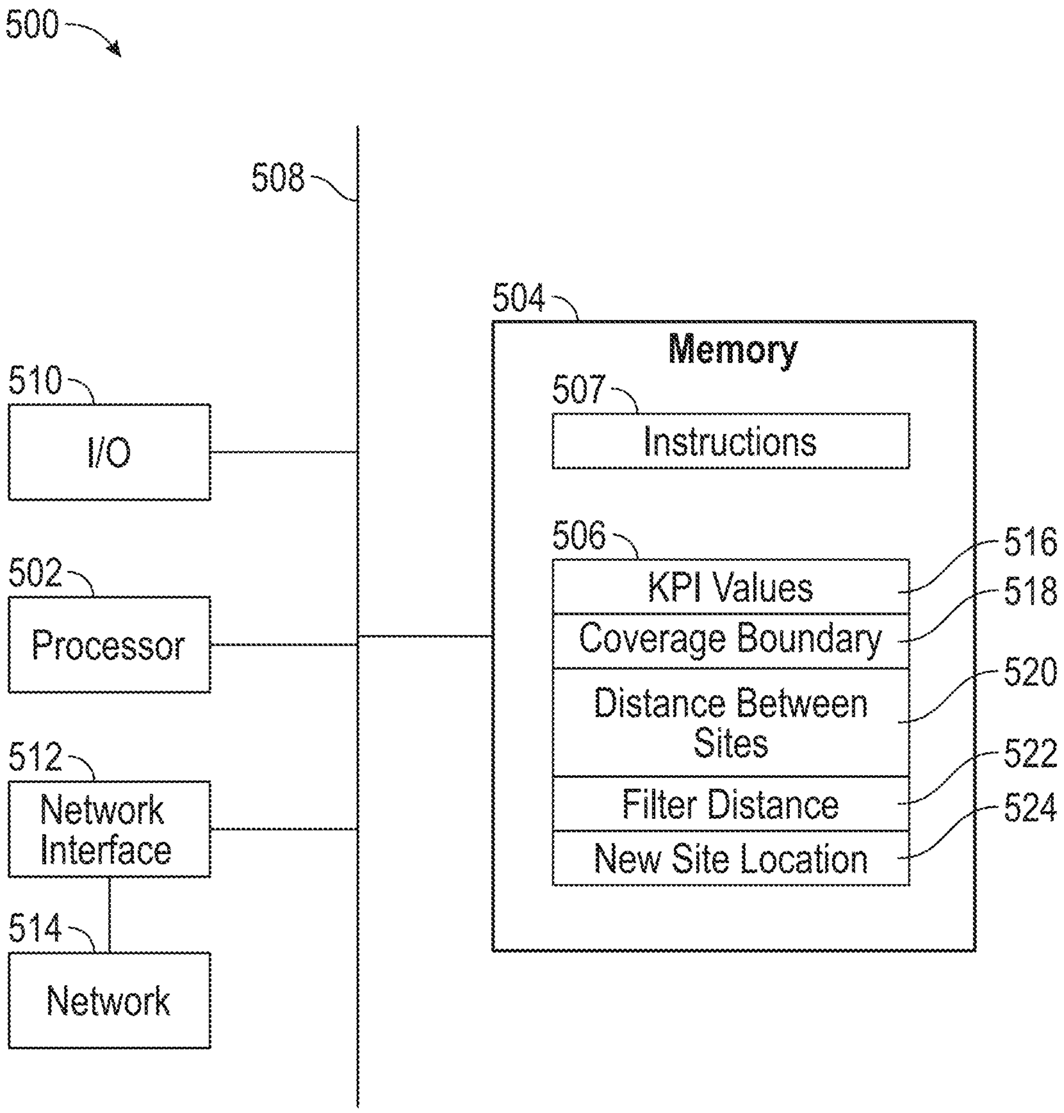
FIG. 5 is a block diagram of a system for implementing VOIP communication analytics in accordance with some embodiments.

FIG. 5 is a block diagram of a system 500 for implementing call analytics in accordance with some embodiments. System 500 includes a hardware processor 502 and a non-transitory, computer readable storage medium 504 encoded with, i.e., storing, the computer program code 506, i.e., a set of executable instructions. Computer readable storage medium 504 is also encoded with instructions 507 for interfacing with external devices. The processor 502 is electrically coupled to the computer readable storage medium 504 via a bus 508. The processor 502 is also electrically coupled to an I/O interface 510 by bus 508. A network interface 512 is also electrically connected to the processor 502 via bus 508. Network interface 512 is connected to a network 514, so that processor 502 and computer readable storage medium 504 are capable of connecting to external elements via network 514. The processor 502 is configured to execute the computer program code 506 encoded in the computer readable storage medium 504 in order to cause system 500 to be usable for performing a portion or all of the operations as described in method 200 (FIG. 2), sequence flow diagram 300 (FIG. 3), or to generate UI 400 (FIG. 4).

In some embodiments, the processor 502 is a central processing unit (CPU), a multi-processor, a distributed processing system, an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 504 stores the computer program code 506 configured to cause system 500 to perform a portion or all of the operations as described in method 200 (FIG. 2), sequence flow diagram 300 (FIG. 3), or to generate UI 400 (FIG. 4). In some embodiments, the storage medium 504 also stores information for performing a portion or all of the operations as described in method 200 (FIG. 2), sequence flow diagram 300 (FIG. 3), or to generate UI 400 (FIG. 4) as well as information generated during performing a portion or all of the operations as described in method 200 (FIG. 2), sequence flow diagram 300 (FIG. 3), or to generate UI 400 (FIG. 4), such as a KPI value parameter 516, a coverage boundary parameter 518, a distance between sites parameter 520, a filter distance parameter 522, a new site location parameter 524 and/or a set of executable instructions to perform a portion or all of the operations as described in method 200 (FIG. 2), sequence flow diagram 300 (FIG. 3), or to generate UI 400 (FIG. 4).

In some embodiments, the storage medium 504 stores instructions 507 for interfacing with external devices. The instructions 507 enable processor 502 to generate and receive instructions readable by the external devices to effectively perform a portion or all of the operations as described in method 200 (FIG. 2), sequence flow diagram 300 (FIG. 3), or to generate UI 400 (FIG. 4).

System 500 includes I/O interface 510. I/O interface 510 is coupled to external circuitry. In some embodiments, I/O interface 510 includes a keyboard, keypad, mouse, trackball, trackpad, and/or cursor direction keys for communicating information and commands to processor 502.

System 500 also includes network interface 512 coupled to the processor 502. Network interface 512 allows system 500 to communicate with network 514, to which one or more other computer systems are connected. Network interface 512 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in method 200 (FIG. 2), sequence flow diagram 300 (FIG. 3), or to generate UI 400 (FIG. 4) is implemented in two or more systems 500, and information is exchanged between different systems 500 via network 514.

An aspect of this description relates to a method of monitoring a telecommunication network. The method includes determining whether a coverage boundary for a new site overlaps with a coverage area for a first existing site. The method further includes determining a minimum distance between existing sites of a plurality of existing sites, in response to determining that the coverage boundary for the new site overlaps with the coverage area for the first existing site, wherein the first existing site is one of the plurality of existing sites. The method further includes determining a final distance based on the minimum distance. The method further includes setting a coverage area for the new site based on the final distance. The method further includes generating a user interface (UI) based on network performance values in the coverage area for the new site and the coverage area of the first existing site, wherein generating the UI comprises excluding network performance values associated with the first existing site from locations within the coverage area of the new site. In some embodiments, determining the minimum distance between the existing sites of the plurality of sites includes setting a standard deviation of the distance between existing sites of the plurality of existing sites as the minimum distance. In some embodiments, determining the final distance includes excluding existing sites of the plurality of sites from the setting of the coverage area for the new site based on a distance of each of the plurality of existing sites from the new site. In some embodiments, setting the coverage area for the new site includes multiplying the final distance by a multiplying factor, and the multiplying factor is less than 1. In some embodiments, the method further includes storing the excluded network performance values in an accessible database. In some embodiments, the network performance values include at least one of power (RSRP), signal to interference/noise ratio (SINR), latency, jitter, or packet loss. In some embodiments, the method further includes generating an alert based on the UI indicating unsatisfactory network performance; and transmitting the alert to a device accessible by a user.

An aspect of this description relates to a system for monitoring a telecommunication network. The system includes a non-transitory computer readable medium, wherein the non-transitory computer readable medium is configured to store instructions thereon. The system further includes a processor connected to the non-transitory computer readable medium. The processor is configured to execute the instructions for determining whether a coverage boundary for a new site overlaps with a coverage area for a first existing site. The processor is further configured to execute the instructions for determining a minimum distance between existing sites of a plurality of existing sites, in response to determining that the coverage boundary for the new site overlaps with the coverage area for the first existing site, wherein the first existing site is one of the plurality of existing sites. The processor is further configured to execute the instructions for determining a final distance based on the minimum distance. The processor is further configured to execute the instructions for setting a coverage area for the new site based on the final distance. The processor is further configured to execute the instructions for generating a user interface (UI) based on network performance values in the coverage area for the new site and the coverage area of the first existing site, wherein generating the UI comprises excluding network performance values associated with the first existing site from locations within the coverage area of the new site. In some embodiments, the processor is further configured to execute the instructions for determining the minimum distance between the existing sites of the plurality of sites using setting a standard deviation of the distance between existing sites of the plurality of existing sites as the minimum distance. In some embodiments, the processor is further configured to execute the instructions for determining the final distance by excluding existing sites of the plurality of sites from the setting of the coverage area for the new site based on a distance of each of the plurality of existing sites from the new site. In some embodiments, the processor is further configured to execute the instructions for setting the coverage area for the new site by multiplying the final distance by a multiplying factor, and the multiplying factor is less than 1. In some embodiments, the processor is further configured to execute the instructions for storing the excluded network performance values in an accessible database. In some embodiments, the network performance values include at least one of power (RSRP), signal to interference/noise ratio (SINR), latency, jitter, or packet loss. In some embodiments, the processor is further configured to execute the instructions for generating an alert based on the UI indicating unsatisfactory network performance; and instructing a transmitter to transmit the alert to a device accessible by a user.

An aspect of this description relates to a non-transitory computer readable medium configured to store instructions thereon. The instructions are configured to cause a processor to determine whether a coverage boundary for a new site overlaps with a coverage area for a first existing site. The instructions are further configured to cause a processor to determine a minimum distance between existing sites of a plurality of existing sites, in response to determining that the coverage boundary for the new site overlaps with the coverage area for the first existing site, wherein the first existing site is one of the plurality of existing sites. The instructions are further configured to cause a processor to determine a final distance based on the minimum distance. The instructions are further configured to cause a processor to set a coverage area for the new site based on the final distance. The instructions are further configured to cause a processor to generate a user interface (UI) based on network performance values in the coverage area for the new site and the coverage area of the first existing site, wherein generating the UI comprises excluding network performance values associated with the first existing site from locations within the coverage area of the new site. In some embodiments, the instructions are further configured to cause the processor to determine the minimum distance between the existing sites of the plurality of sites using a standard deviation of the distance between existing sites of the plurality of existing sites as the minimum distance. In some embodiments, the instructions are further configured to cause the processor to determine the final distance by excluding existing sites of the plurality of sites from the setting of the coverage area for the new site based on a distance of each of the plurality of existing sites from the new site. In some embodiments, the instructions are further configured to cause the processor to store the excluded network performance values in an accessible database. In some embodiments, the network performance values include at least one of power (RSRP), signal to interference/noise ratio (SINR), latency, jitter, or packet loss. In some embodiments, the instructions are further configured to cause the processor to generate an alert based on the UI indicating unsatisfactory network performance; and instruct a transmitter to transmit the alert to a device accessible by a user.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of monitoring a telecommunication network, the method comprises:

determining whether a coverage boundary for a new site overlaps with a coverage area for a first existing site;

determining a minimum distance between existing sites of a plurality of existing sites, in response to determining that the coverage boundary for the new site overlaps with the coverage area for the first existing site, wherein the first existing site is one of the plurality of existing sites;

determining a final distance based on the minimum distance;

setting a coverage area for the new site based on the final distance; and generating a user interface (UI) based on network performance values in the coverage area for the new site and the coverage area of the first existing site, wherein generating the UI comprises excluding network performance values associated with the first existing site from only locations within the coverage area of the new site.

2. The method of claim 1, wherein determining the minimum distance between the existing sites of the plurality of sites comprises setting a standard deviation of the distance between existing sites of the plurality of existing sites as the minimum distance.

3. The method of claim 1, wherein determining the final distance comprises excluding existing sites of the plurality of sites from the setting of the coverage area for the new site based on a distance of each of the plurality of existing sites from the new site.

4. The method of claim 1, wherein setting the coverage area for the new site comprises multiplying the final distance by a multiplying factor, and the multiplying factor is less than 1.

5. The method of claim 1, further comprising storing the excluded network performance values in an accessible database.

6. The method of claim 1, wherein the network performance values include at least one of power (RSRP), signal to interference/noise ratio (SINR), latency, jitter, or packet loss.

7. The method of claim 4, further comprising:
- generating an alert based on the UI indicating unsatisfactory network performance; and
- transmitting the alert to a device accessible by a user.

8. A system for monitoring a telecommunication network, the system comprising:
- a non-transitory computer readable medium, wherein the non-transitory computer readable medium is configured to store instructions thereon; and
- a processor connected to the non-transitory computer readable medium, wherein the processor is configured to execute the instructions for:
  - determining whether a coverage boundary for a new site overlaps with a coverage area for a first existing site;
  - determining a minimum distance between existing sites of a plurality of existing sites, in response to determining that the coverage boundary for the new site overlaps with the coverage area for the first existing site, wherein the first existing site is one of the plurality of existing sites;
  - determining a final distance based on the minimum distance;
  - setting a coverage area for the new site based on the final distance; and
  - generating a user interface (UI) based on network performance values in the coverage area for the new site and the coverage area of the first existing site, wherein generating the UI comprises excluding network performance values associated with the first existing site from only locations within the coverage area of the new site.

9. The system of claim 8, wherein the processor is further configured to execute the instructions for determining the minimum distance between the existing sites of the plurality of sites using setting a standard deviation of the distance between existing sites of the plurality of existing sites as the minimum distance.

10. The system of claim 8, wherein the processor is further configured to execute the instructions for determining the final distance by excluding existing sites of the plurality of sites from the setting of the coverage area for the new site based on a distance of each of the plurality of existing sites from the new site.

11. The system of claim 8, wherein the processor is further configured to execute the instructions for setting the coverage area for the new site by multiplying the final distance by a multiplying factor, and the multiplying factor is less than 1.

12. The system of claim 8, wherein the processor is further configured to execute the instructions for storing the excluded network performance values in an accessible database.

13. The system of claim 8, wherein the network performance values include at least one of power (RSRP), signal to interference/noise ratio (SINR), latency, jitter, or packet loss.

14. The system of claim 11, wherein the processor is further configured to execute the instructions for:
- generating an alert based on the UI indicating unsatisfactory network performance; and
- instructing a transmitter to transmit the alert to a device accessible by a user.

15. A non-transitory computer readable medium configured to store instructions thereon, wherein the instructions are configured to cause a processor to:
- determine whether a coverage boundary for a new site overlaps with a coverage area for a first existing site;
- determine a minimum distance between existing sites of a plurality of existing sites, in response to determining that the coverage boundary for the new site overlaps with the coverage area for the first existing site, wherein the first existing site is one of the plurality of existing sites;
- determine a final distance based on the minimum distance;
- set a coverage area for the new site based on the final distance; and
- generate a user interface (UI) based on network performance values in the coverage area for the new site and the coverage area of the first existing site, wherein generating the UI comprises excluding network performance values associated with the first existing site from only locations within the coverage area of the new site.

16. The non-transitory computer readable medium of claim 15, wherein the instructions are further configured to cause the processor to determine the minimum distance between the existing sites of the plurality of sites using a standard deviation of the distance between existing sites of the plurality of existing sites as the minimum distance.

17. The non-transitory computer readable medium of claim 15, wherein the instructions are further configured to cause the processor to determine the final distance by excluding existing sites of the plurality of sites from the setting of the coverage area for the new site based on a distance of each of the plurality of existing sites from the new site.

18. The non-transitory computer readable medium of claim 15, wherein the instructions are further configured to cause the processor to store the excluded network performance values in an accessible database.

19. The non-transitory computer readable medium of claim 15, wherein the network performance values include at least one of power (RSRP), signal to interference/noise ratio (SINR), latency, jitter, or packet loss.

20. The non-transitory computer readable medium of claim 15, wherein setting the coverage area for the new site comprises multiplying the final distance by a multiplying factor, and the multiplying factor is less than 1, and the instructions are further configured to cause the processor to:

generate an alert based on the UI indicating unsatisfactory network performance; and instruct a transmitter to transmit the alert to a device accessible by a user.

* * * * *